(12) United States Patent
Nitzken

(10) Patent No.: US 10,808,845 B2
(45) Date of Patent: Oct. 20, 2020

(54) BI-DIRECTIONAL SELF-ENERGIZING GASKETS

(71) Applicant: Thermal Engineering International (USA) Inc., Santa Fe, CA (US)

(72) Inventor: Joseph A. Nitzken, Louisville, KY (US)

(73) Assignee: Thermal Engineering International (USA) Inc., Santa Fe Springs, CA (US)

( * ) Notice: Subject to any disclaimer, the term of this patent is extended or adjusted under 35 U.S.C. 154(b) by 106 days.

(21) Appl. No.: 15/946,896

(22) Filed: Apr. 6, 2018

(65) Prior Publication Data

US 2019/0309851 A1 Oct. 10, 2019

(51) Int. Cl.
| | |
|---|---|
| *F16J 15/16* | (2006.01) |
| *F16J 15/48* | (2006.01) |
| *F16J 15/08* | (2006.01) |
| *F16L 5/10* | (2006.01) |
| *F16J 15/3224* | (2016.01) |

(52) U.S. Cl.
CPC ......... *F16J 15/164* (2013.01); *F16J 15/0881* (2013.01); *F16J 15/48* (2013.01); *F16J 15/3224* (2013.01); *F16L 5/10* (2013.01)

(58) Field of Classification Search
CPC ........ F16J 15/164; F16J 15/0881; F16J 15/48; F16J 15/3224; F16L 5/10
See application file for complete search history.

(56) References Cited

U.S. PATENT DOCUMENTS

| | | | | |
|---|---|---|---|---|
| 2,898,000 | A * | 8/1959 | Hanny | F16J 15/0887 277/649 |
| 3,327,777 | A * | 6/1967 | Kovalik | F28F 21/02 165/81 |
| 3,831,950 | A * | 8/1974 | Bentley | F16J 15/3236 277/649 |
| 6,540,234 | B1 * | 4/2003 | Atkinson | F16J 15/0825 277/612 |
| 7,857,322 | B2 * | 12/2010 | Fietz | F16J 15/025 277/566 |
| 8,006,748 | B2 * | 8/2011 | Modi | F28D 7/16 165/158 |
| 2009/0095453 | A1 * | 4/2009 | Modi | F28D 7/16 165/158 |

* cited by examiner

*Primary Examiner* — Gilbert Y Lee
(74) *Attorney, Agent, or Firm* — Locke Lord LLP; Joshua L. Jones

(57) ABSTRACT

A heat exchanger includes a shell. A tubesheet is mounted to the shell. A plurality of tubes extend from the tubesheet and into the shell for heat exchange between a first fluid within the tubes and a second fluid in the shell outside the tubes. The tubesheet divides an interior of the shell into a heat exchange chamber where the tubes can exchange heat with the second fluid, an inlet-outlet chamber for the first fluid to enter and exit the tubes. A breech lock locks the tubesheet within the shell. A bi-directionally self-energizing gasket is seated between the tubesheet and the shell to seal the heat exchange chamber from the inlet-outlet chamber. The gasket is configured to be self-energizing to seal regardless of whether there is a higher pressure in the heat exchange chamber or in the inlet-outlet chamber.

9 Claims, 3 Drawing Sheets

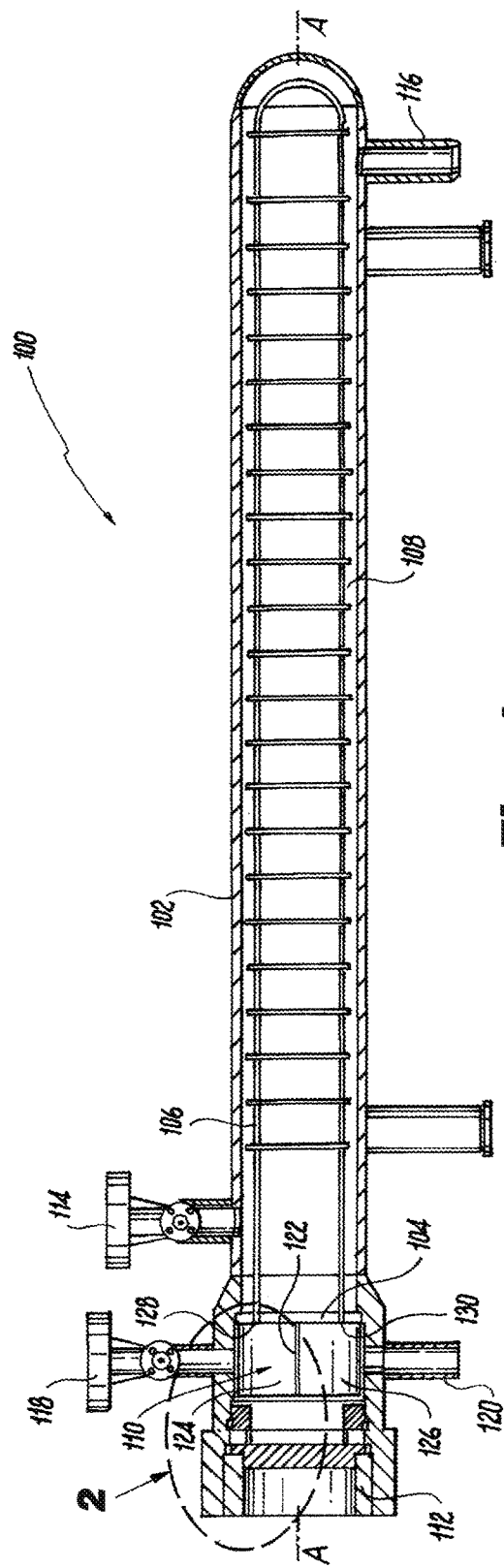
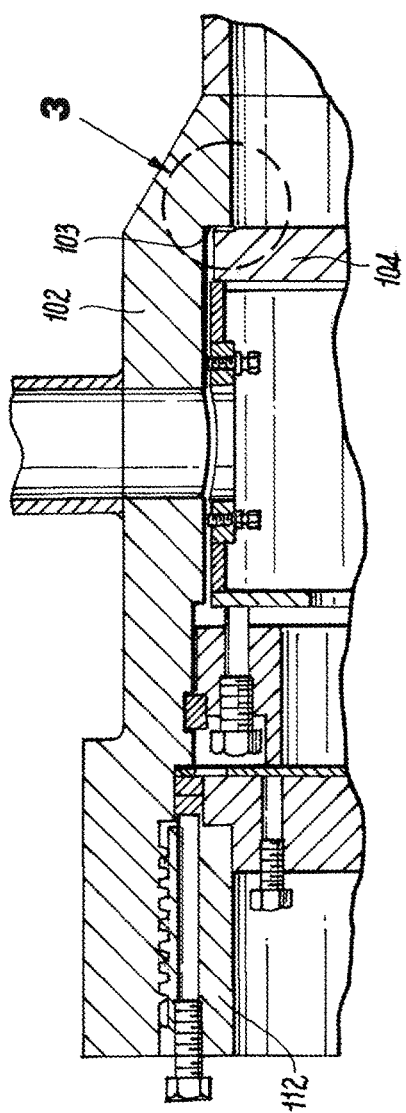
Fig. 1
Fig. 2

BI-DIRECTIONAL SELF-ENERGIZING GASKETS

BACKGROUND OF THE INVENTION

1. Field of the Invention

The present disclosure relates to seals and gaskets, and more particularly to self-energizing seals.

2. Description of Related Art

Breech lock (or screw lock) heat exchangers have become a standard for special high pressure heat exchange applications. Traditional designs have leakage issues at the shell-to-tubesheet gasket, particularly after a rapid system shutdown or a plant trip. Upon restart of the heat exchangers, system process fluid leaks from the higher pressure side into the lower pressure side. This leakage is particularly noticeable in the first several heat exchangers of a heat exchanger network.

The bolts and pushrods of breech lock heat exchanger units are not always readjusted or retightened before a system is started up. It is also not always certain that retightening the inner external screws with pushrods after a shutdown will seal the tubesheet to the shell, particularly if particles or contaminants have been able to lodge onto the shell-to-tubesheet gasket.

The industry has accepted that temperature, pressure, movement, and material/component relaxations can accumulate to increase the clearance spaces between the tubesheet and shell, which can allow leakage. While the readjustment of the bolts and pushrods may help to some extent, there are still significant occurrences of leakage.

The conventional techniques have been considered satisfactory for their intended purpose. However, there is an ever present need for improved sealing. This disclosure provides a solution for this need.

SUMMARY OF THE INVENTION

A heat exchanger includes a shell. A tubesheet is engaged to the shell. A plurality of tubes extend from the tubesheet and into the shell for heat exchange between a first fluid within the tubes and a second fluid in the shell outside the tubes. The tubesheet divides an interior of the shell into a heat exchange chamber where the tubes can exchange heat with the second fluid, an inlet-outlet chamber for the first fluid to enter and exit the tubes. A breech lock locks the tubesheet against the shell. The breech lock is spaced apart from the tubesheet across the inlet-outlet chamber. A bi-directionally self-energizing gasket is seated between the tubesheet and the shell to seal the heat exchange chamber from the inlet-outlet chamber. The gasket is configured to be self-energizing to seal regardless of whether there is a higher pressure in the heat exchange chamber or in the inlet-outlet chamber.

The shell can include an inlet and an outlet for the first fluid. The inlet-outlet chamber can include an inlet and an outlet for the second fluid. The inlet-outlet chamber can be subdivided by a plate into an inlet section and an outlet section. Each of the tubes can have an inlet through the tubesheet in fluid communication with the inlet section and an outlet through the tubesheet in fluid communication with the outlet section.

The gasket can be annular and can be engaged axially between an annular face of the shell and an annular face of the tubesheet. The gasket can include any suitable material such as steel, stainless steel, delrin, plastic, bronze, and/or rubber. The main body of the gasket can include a radially inward opening self-energizing feature configured to increase sealing engagement with pressure in the heat exchange chamber. The radially inward opening self-energizing feature can include a pair of axially spaced ridges extending from the main body of the gasket on either side of an annular pocket that opens radially inward from the main body of the gasket. The radially inward opening self-energizing feature can include a pair of axially opposed annular channels in the main body of the gasket proximate the annular pocket to facilitate flexure of the ridges for self-energized sealing of the ridges against the shell and the tubesheet, respectively.

The main body of the gasket can include a radially outward opening self-energizing feature configured to increase sealing engagement with pressure in the inlet-outlet chamber. The radially outward opening self-energizing feature can include a pair of axially spaced ridges extending from the main body of the gasket on either side of an annular pocket that opens radially outward from the main body of the gasket. The radially outward opening self-energizing feature can include a pair of axially opposed annular channels in the main body of the gasket proximate the annular pocket to facilitate flexure of the ridges for self-energized sealing of the ridges against the shell and the tubesheet, respectively.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 1 is a schematic cross-sectional side elevation view of an exemplary embodiment of a breech lock heat exchanger constructed in accordance with the present disclosure, showing the tubesheet and tubes;

FIG. 2 is a schematic cross-sectional side elevation view of a portion of the heat exchanger of FIG. 1, showing the engagement of the tubesheet to the shell;

DETAILED DESCRIPTION OF THE PREFERRED EMBODIMENTS

Figure 3:
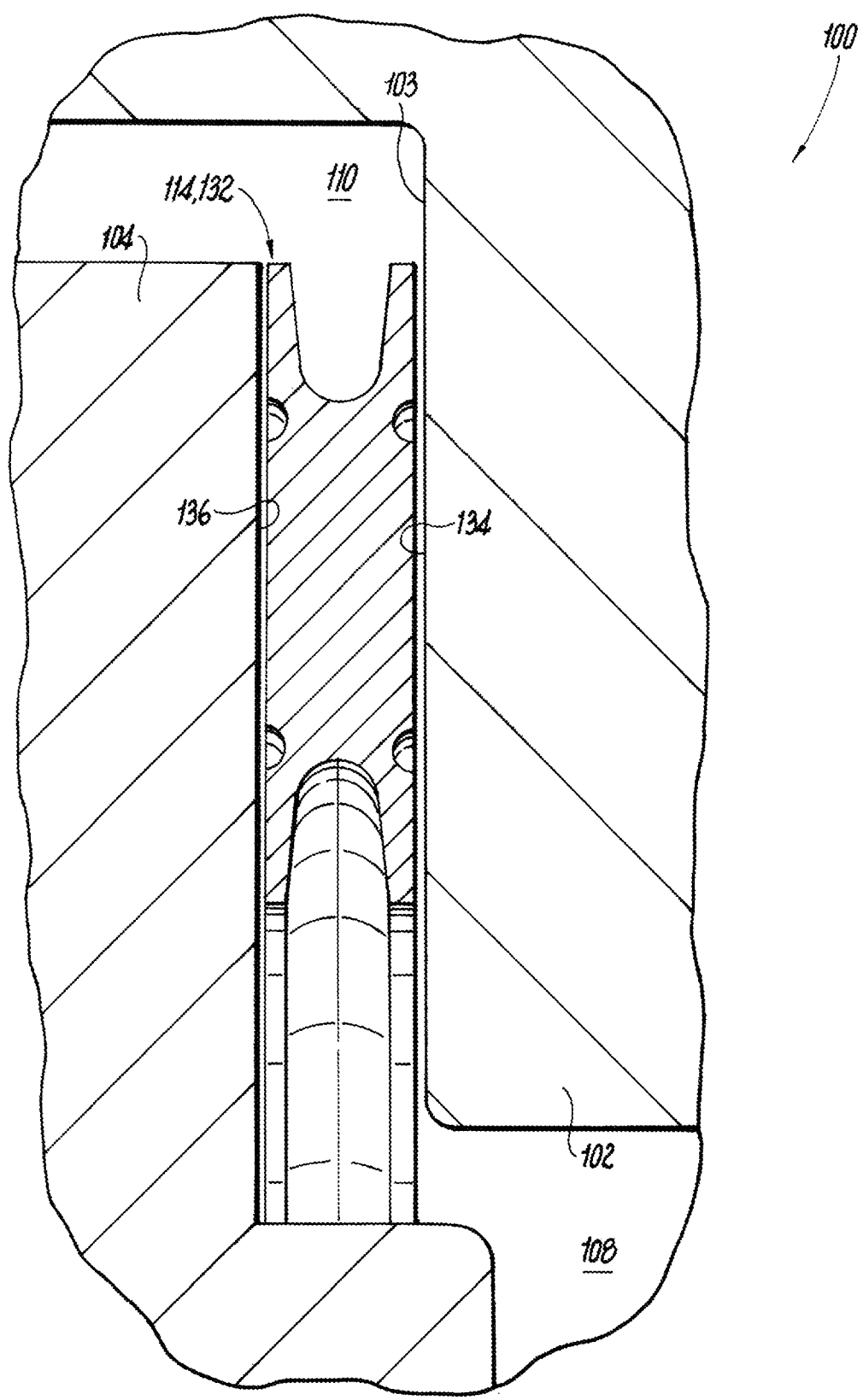
FIG. 3 is a schematic cross-sectional side elevation view of a portion of the heat exchanger of FIG. 1, showing the gasket engaged between the shell and the tubesheet.
Figure 4:
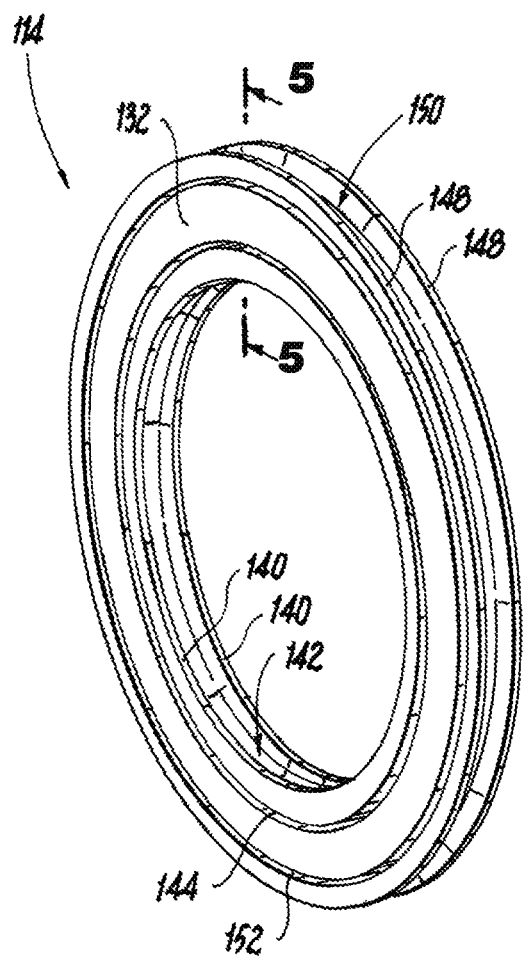
FIG. 4 is a perspective view of the gasket of FIG. 3, showing the annular main body of the gasket.

Reference will now be made to the drawings wherein like reference numerals identify similar structural features or aspects of the subject disclosure. For purposes of explanation and illustration, and not limitation, a partial view of an exemplary embodiment of a heat exchanger in accordance with the disclosure is shown in FIG. 1 and is designated generally by reference character 100. Other embodiments of heat exchangers in accordance with the disclosure, or aspects thereof, are provided in FIGS. 2-5, as will be described. The systems and methods described herein can be used to seal breech lock heat exchangers, for example, regardless of from which direction the high pressure is applied.

The heat exchanger 100 includes a shell 102 that extends axially along a longitudinal axis A. A tubesheet 104 is engaged against the shell 102. A plurality of tubes 106 (only one of which is shown in FIG. 1 for sake of clarity) extend from the tubesheet 104 and into the shell 102 for heat exchange between a first fluid within the tubes 106 and a second fluid in the shell 102 outside the tubes 106. The tubesheet 104 divides the interior of the shell 102 into a heat exchange chamber 108 where the tubes 106 can exchange heat with the second fluid, an inlet-outlet chamber 110 for the first fluid to enter and exit the tubes 106. A breech lock 112 locks the tubesheet 104 within and against the shell 102. The breech lock 112 is spaced apart axially from the tubesheet 104 across the inlet-outlet chamber 110, also called the channel.

The shell 102 includes an inlet 114 and an outlet 116 each in fluid communication with the heat exchange chamber 108 for circulation of the first fluid therein. The inlet-outlet chamber 110 includes an inlet 118 and an outlet 120 in fluid communication with the interior of the inlet-outlet chamber 110 for circulation of the second fluid therethrough. The inlet-outlet chamber 110 is subdivided by a plate 122 into an inlet section 124 and an outlet section 126. Each of the tubes 106 has an inlet 128 extended through the tubesheet 104 in fluid communication with the inlet section 124 and an outlet 130 extended through the tubesheet 104 in fluid communication with the outlet section 126.

With reference now to FIG. 2, the engagement of the tubesheet 104 in the shell is shown in greater detail. The breech lock 112 can apply an axial force on the tubesheet 104, pressing it against the shell 102, e.g., against the shoulder 103 of the shell 102. As shown in even greater detail in FIG. 3, a bi-directionally self-energizing gasket 114 is seated between the tubesheet 104 and the shell 102 to seal the shell side heat exchange chamber 108 from the inlet-outlet channel side chamber 110. The gasket 114 includes an annular main body 132, shown in FIG. 4, and is engaged axially between an annular face 134 of the shell 102 and an annular face 136 of the tubesheet 104. The gasket 114 can be made of stainless steel for high pressure, high temperature, and/or highly corrosive fluids. Those skilled in the art will readily appreciation that any other suitable material, hard or soft, can be used for a given application such as steel, delrin, plastic, bronze, rubber, or the like, could be used for other chemical, temperature, and/or pressure applications including applications unrelated to the exemplary heat exchangers disclosed herein. The gasket 114 is configured to be self-energizing to seal with pressure from both sides regardless of whether there is a higher pressure in the heat exchange chamber 108 or in the inlet-outlet chamber 110. The sealing configuration can therefore work in both directions simultaneously.

Figure 5:
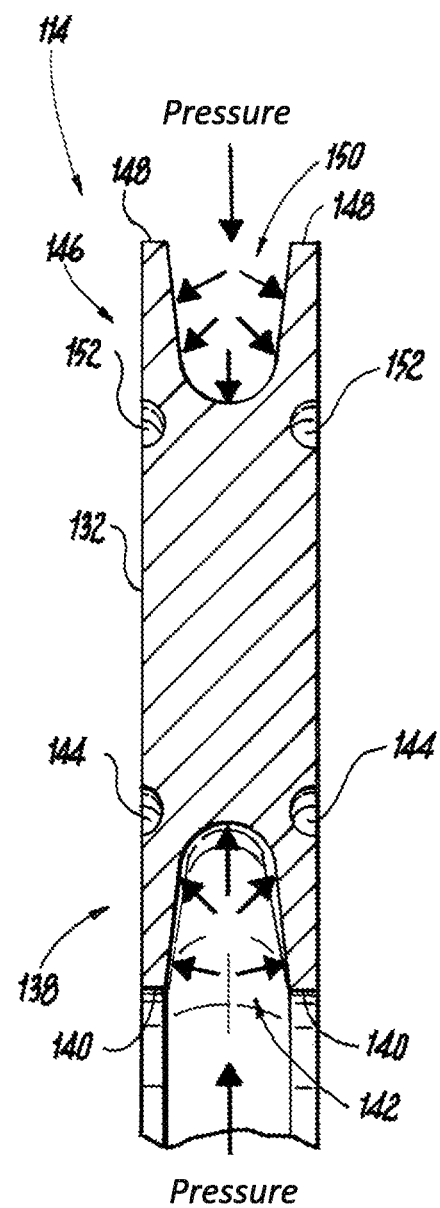
FIG. 5 is a radial cross-sectional view of the gasket of FIG. 4, showing the self-energizing features.

With reference now to FIG. 5, the main body 132 of the gasket 114 includes a radially inward opening self-energizing feature 138 configured to increase sealing engagement with pressure in the heat exchange chamber 108 and/or in the inlet-outlet chamber 110. The self-energizing feature 138 includes a pair of axially spaced ridges 140 extending from the main body of the gasket 114 on either side of an annular pocket 142 that opens radially inward from the main body 132 of the gasket 114. The self-energizing feature 138 includes a pair of axially opposed annular channels 144 in the main body of the gasket proximate the annular pocket 142 to facilitate flexure of the ridges 140 away from each other for self-energized sealing of the ridges 140 against the shell 102 and the tubesheet 104, respectively.

With continued reference to FIG. 5, the main body 132 of the gasket 114 also includes a radially outward opening self-energizing feature 146 configured to increase sealing engagement with pressure in the inlet-outlet chamber 110 of the heat exchange chamber. The self-energizing feature 146 includes a pair of axially spaced ridges 148 extending from the main body 132 of the gasket 114 on either side of an annular pocket 150 that opens radially outward from the main body 132 of the gasket 114. The self-energizing feature 146 includes a pair of axially opposed annular channels 152 in the main body 132 of the gasket 114 proximate the annular pocket 150 to facilitate flexure or deflection of the ridges 148 away from each other for self-energized sealing of the ridges 148 against the shell 102 and the tubesheet 104, respectively, as indicated by the pressure arrows in FIG. 5.

The gasket 114 can be initially seated by push rod forces from breech lock 112, and it can be reseated by pressure acting on the self-energizing features 138 and 146. Sealing the engagement of the shell 102 and the tubesheet 104 with gasket 114 prevents leakage to maintain separation of the first and second fluids in the tubes 106 and heat exchange chamber 108. Since the gasket 114 is self-energizing in response to pressure from the heat exchanger chamber 108 as well as in the opposite direction in response to the inlet-outlet chamber 110, the gasket 114 can provide sealing even when the pressure differential across the gasket 114 changes direction. This allows for uninterrupted sealing to prevent leakage in shutdowns, system transients, and restarts.

The methods and systems of the present disclosure, as described above and shown in the drawings, provide for sealing with superior properties including the ability to reduce or prevent leakage where traditional systems could not. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A heat exchanger comprising:
   a shell;
   a tubesheet engaged to the shell, wherein a plurality of tubes extend from the tubesheet and into the shell for heat exchange between a first fluid within the tubes and a second fluid in the shell outside the tubes, wherein the tubesheet divides an interior of the shell into heat exchange chamber where the tubes can exchange heat with the second fluid, an inlet-outlet chamber for the first fluid to enter and exit the tubes;
   a breech lock locking the tubesheet against the shell, wherein the breech lock is spaced apart from the tubesheet across the inlet-outlet chamber; and
   a bi-directionally self-energizing gasket seated between the tubesheet and the shell to seal the heat exchange chamber from the inlet-outlet chamber, wherein the gasket is configured to be self-energizing to seal regardless of whether there is a higher pressure in the heat exchange chamber or in the inlet-outlet chamber where the pressure loads are exerted in a radial direction, wherein the gasket includes an annular main body, and wherein the gasket is engaged axially between an annular face of the shell and an annular face of the tubesheet, wherein the main body of the gasket includes a radially inward opening self-energizing feature configured to increase sealing engagement with pressure the heat exchange chamber, wherein the self-energizing feature includes a pair of axially spaced ridges extending from the main body of the gasket on either side of one and only one annular pocket that opens radially outward from the main body of the gasket, wherein the main body of the gasket includes a radially outward opening self-energizing feature configured to increase sealing engagement with pressure in the inlet-outlet chamber, wherein the self-energizing feature includes a pair of axially spaced ridges extending from the main body of the gasket on either side of one and only one annular pocket that opens radially inward from the main body of the gasket.

2. The heat exchanger as recited in claim 1, wherein the shell includes an inlet and an outlet for the first fluid, wherein the inlet-outlet chamber includes an inlet and an outlet for the second fluid, wherein the inlet-outlet chamber is subdivided by a plate into an inlet section and an outlet section, and wherein each of the tubes has an inlet through the tubesheet in fluid communication with the inlet section and an outlet through the tubesheet in fluid communication with the outlet section.

3. The heat exchanger as recited in claim 1, wherein the self-energizing feature includes a pair of axially opposed annular channels in the main body of the gasket proximate the annular pocket to facilitate flexure of the ridges for self-energized sealing of the ridges against the shell and the tubesheet, respectively.

4. The heat exchanger as recited in claim 1, wherein the self-energizing feature includes a pair of axially opposed annular channels in the main body of the gasket proximate the annular pocket to facilitate flexure of the ridges for self-energized sealing of the ridges against the shell and the tubesheet, respectively.

5. The heat exchanger as recited in claim 1, wherein the gasket includes a stainless steel material.

6. A gasket comprising:
a bi-directionally self-energizing main body, wherein the main body is configured to be self-energizing to seal regardless of with pressure from a first direction and/or from a second direction opposite the first direction where the pressure loads are exerted in a radial direction, wherein the main body is annular, wherein the main body includes a radially inward opening self-energizing feature configured to increase sealing engagement with pressure in a heat exchange chamber, wherein the self-energizing feature includes a pair of axially spaced ridges extending from the main body of the gasket on either side of one and only one annular pocket that opens radially inward from the main body of the gasket, wherein the gasket includes a radially outward opening self-energizing feature configured to increase sealing engagement with pressure in a inlet-outlet chamber, wherein the self-energizing feature includes a pair of axially spaced ridges extending from the main body on either side of one and only one annular pocket that opens radially outward from the main body.

7. The gasket as recited in claim 6, wherein the self-energizing feature includes a pair of axially opposed annular channels in the main body proximate the annular pocket to facilitate flexure of the ridges for self-energized sealing of the ridges.

8. The gasket as recited claim 6, wherein the self-energizing feature includes a pair of axially opposed annular channels in the main body proximate the annular pocket to facilitate flexure of the ridges for self-energized sealing of the ridges.

9. The gasket as recited in claim 6, wherein the main body includes a material including at least one of steel, stainless steel, delrin, plastic, bronze, and/or rubber.

\* \* \* \* \*